US006999495B2

(12) United States Patent
Popenov et al.

(10) Patent No.: US 6,999,495 B2
(45) Date of Patent: Feb. 14, 2006

(54) METHOD AND APPARATUS FOR SPATIAL ENERGY COVERAGE

(75) Inventors: Alex Popenov, Duluth, GA (US); Peter van Kampen, Woodstock, GA (US); Yury Eyfa, Tucker, GA (US); Olivier Delabroy, Atlanta, GA (US)

(73) Assignee: Air Liquide America, LP, Houston, TX (US)

( * ) Notice: Subject to any disclaimer, the term of this patent is extended or adjusted under 35 U.S.C. 154(b) by 0 days.

(21) Appl. No.: 10/730,362

(22) Filed: Dec. 8, 2003

(65) Prior Publication Data

US 2004/0174920 A1 Sep. 9, 2004

Related U.S. Application Data

(60) Provisional application No. 60/434,922, filed on Dec. 19, 2002.

(51) Int. Cl.
*F27D 1/00* (2006.01)

(52) U.S. Cl. ............................. 373/71; 373/60; 373/66; 373/75

(58) Field of Classification Search ................. 373/2, 373/9, 24, 30, 34, 44, 45, 60–64, 71–77, 373/66; 266/186, 225, 47, 223; 75/10.4, 75/10.46; 431/10, 189
See application file for complete search history.

(56) References Cited

U.S. PATENT DOCUMENTS

| 4,077,614 | A | 3/1978 | Udo |
| 4,526,531 | A | 7/1985 | Kai |
| 4,622,007 | A | 11/1986 | Gitman |
| 5,332,199 | A | 7/1994 | Knapp |
| 5,554,022 | A | 9/1996 | Nabors, Jr. et al. |
| 5,599,375 | A | 2/1997 | Gitman |
| 5,802,097 | A | 9/1998 | Gensini |
| 6,212,218 | B1 | 4/2001 | Shver |
| 6,229,838 | B1 | 5/2001 | Flichy et al. |
| 6,289,035 | B1 * | 9/2001 | Shver .......................... 373/66 |
| 6,342,086 | B1 | 1/2002 | Shver |
| 6,400,747 | B1 | 6/2002 | Mathur |
| 6,614,831 | B1 | 9/2003 | Shver |
| 6,749,661 | B1 | 6/2004 | Shver |
| 6,805,724 | B1 | 10/2004 | Shver |
| 2004/0213318 | A1 * | 10/2004 | Strelbisky .................... 373/66 |

FOREIGN PATENT DOCUMENTS

| EP | 0639750 | 2/1995 |
| EP | 0 964 065 A1 | 6/1999 |
| EP | 1170385 | 1/2002 |
| WO | WO 02 099143 A1 | 5/2002 |

OTHER PUBLICATIONS

"Further Advances in EAF Efficiency PyreJet Burner Injection", published in Sep. 2001 by Steel Times International.
International Search Report for PCT/IB 03/06062.

\* cited by examiner

*Primary Examiner*—Tu Hoang
(74) *Attorney, Agent, or Firm*—Linda K. Russell

(57) ABSTRACT

A method and apparatus for increasing spatial energy coverage in a furnace is provided. The apparatus of the present invention includes a panel positioned at least partially into a sidewall of a furnace. The panel includes a plurality of openings for injecting a material through each of the openings at least partially during the same time period. The method of the present invention includes positioning the panel at least partially within the sidewall of a furnace. The method also includes injecting at least partially during the same time period, a primary combustion material, a secondary combustion material, and a particulate material, into the furnace.

48 Claims, 11 Drawing Sheets

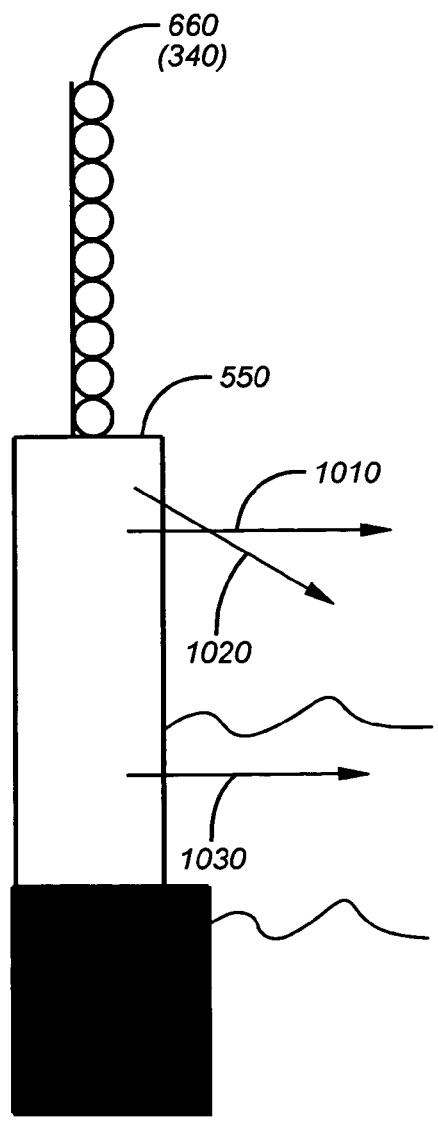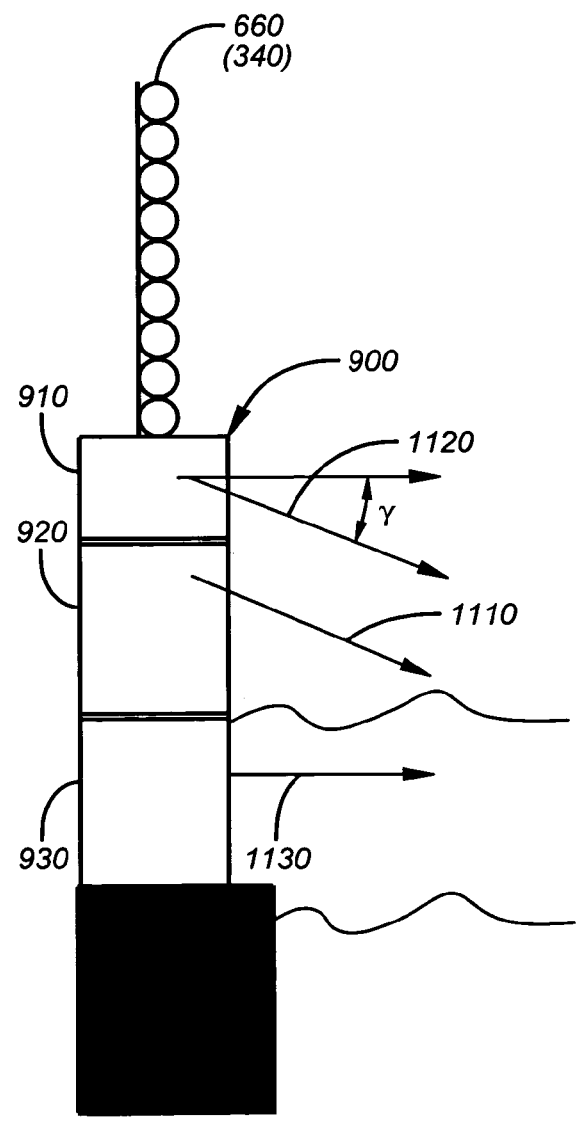
FIG. 10          FIG. 11

METHOD AND APPARATUS FOR SPATIAL ENERGY COVERAGE

CROSS REFERENCE TO RELATED APPLICATIONS

This application claims the benefit of U.S. Provisional Application No. 60/434,922, filed Dec. 19, 2002, the entire contents of which are incorporated herein by reference.

BACKGROUND OF THE INVENTION

1. Field of the Invention

This invention relates to electric arc furnace steelmaking systems and, in particular, to an apparatus and a method for increasing spatial coverage of chemical energy in such a furnace.

2. Description of the Related Art

There has been much advancement in the art of electric arc furnace steelmaking that has produced more efficient methods for producing steel products. Steelmakers have generally strived to increase the efficiency of processes used in steelmaking processes. In the quest for more efficient processes, higher amounts of energy are desired in electric arc furnaces during the various stages of the steelmaking processes. Those stages are generally divided in the heating/melting stage and one refining stage of molten material. Steelmakers generally increase efficiency in steelmaking processes by implementing energy in addition to electrical energy, in the form of chemical energy, for example. Those skilled in the art may use various methods to implement the chemical energy into process/combustion chambers. In order to increase efficiency in steelmaking processes, steelmakers generally aspire to increase spatial coverage of the chemical energy in electric arc furnaces.

Turning now to FIG. 1, a depiction of a prior art electric arc furnace 100 is illustrated. The electric arc furnace 100 generally comprises three portions: a roof 110, an upper shell 120, and a lower shell 130. The electrodes 150 can move up and down through the roof 110. The line 140 between the upper shell and the lower shell is called the split line. The upper shell 120 is generally made out of water-cooled steel or copper panels. The lower shell 130 is usually non-water-cooled refractory lined. The internal space delimited by the lower shell 130, the upper shell 120 and the roof 110 constitutes the vessel in which the process of steelmaking takes place. Steelmakers generally implement additional chemical energy to increase spatial energy coverage through the walls that constitutes the upper shell 120 of the electric arc furnace 100. The upper shell 120 of the electric arc furnace 100 is described in further detail below.

In addition to electrical energy, chemical energy is added to the upper shell 120 of the furnace 100. The chemical energy input may be introduced into the electric arc furnace 100 via dedicated lances or burners. The chemical energy input generally includes oxidant gas and/or hydrocarbon fuel (gaseous or liquid). The oxidant gas generally refers to oxygen-enriched air, with oxygen concentration being more than a predetermined percentage (e.g., 25%) by volume of oxygen. Those skilled in the art will appreciate that the term "oxygen" may include oxidant gas and/or oxygen enriched-gas.

Lances may be used to inject chemical energy into the electric arc furnace 100. One category of lances 260 is made of consumable pipe that may carry the desired gases to be added to the furnace 100. Such a lance is generally moved through the tunnel, which is closed generally by a movable slag door 240 associated with the furnace 100, and is either manually operated or operated by automated moving devices. Such a lance 260 is generally submerged either inside the molten pool bath or in the slag. Generally, lances 260 are inserted into the furnace 100 at predetermined angles. A typical insertion angle of the oxygen injected through consumable lances may be 10–15 degrees relative to horizontal reference. Another alternative is to use water-cooled lances 260 moving through the tunnel closed by the slag door 240 or through the sidewalls of the upper shell 120 of the furnace 100. In the case where oxygen is injected through the lance 260, the velocity of the oxygen jet produced by the lances 260 is generally supersonic velocity, and the vertical angle of the oxygen jet pointing down may be approximately 55 degrees relative to a horizontal reference.

The chemical energy injected by the lances 260 is traditionally limited to an oxygen injection and/or a carbon particulate injection. Some chemical injection systems also have the function of generating a flame through a burner. In some state-of-the-art embodiments, the flame shrouds the supersonic oxygen jet, insuring a longer travel distance at supersonic velocity. An example of this multi-function tool is the PyreJet, commercially promoted by Air Liquide, Inc. A description of the PyreJet and its implementation may be found in U.S. Pat. Nos. 4,622,007 and 5,599,375 or in "Further Advances in EAF Efficiency with PyreJet burner injection", published in September 2001 by Steel Times International.

Turning now to FIG. 2, a cross-section diagram of the upper shell 120 of the prior art electric arc furnace 100 is illustrated. The portion of the electric arc furnace 100 illustrated in FIG. 2 is one of an AC furnace. The three electrodes 150 are shown. The depiction in FIG. 2 illustrates a sidewall 220 enclosing the upper shell 120 of the electric arc furnace 100, which delimits the interior of the electric arc furnace. The movable slag door 240 is used to evacuate the furnace 100 of slag formed during the steelmaking process. Also, the opening of the slag door 240 is used to facilitate the sampling of steel temperature and the sampling for carbon content analysis. Additionally, the slag door 240 may be opened to introduce various fluids or particles in the reaction vessel, including oxygen and/or carbon particulates by lances 260 as described above. Various injection points or openings 250 may be installed within in the sidewalls 220 in order to allow for injection of fluids or particles, in order to introduce chemical energy inside the electric arc furnace 100 through the sidewalls 220. The injection points 250 allow for the injection of fluids or materials, which generally results in affected areas 230 where the chemical energy may be concentrated. For instance, if the injected fluids are fuel and oxygen, the affected area 230 may be defined by the flame envelope. Typically, utilizing state of the art technology, the affected areas 230 are generally small. There is a desire to produce a larger affected area 230 to introduce more efficient chemical energy implementation into the electric arc furnace 100 and increase the spatial coverage of such implementation.

To maintain efficiency, the number of openings in the sidewall 220 is generally limited. Typically, the number of openings in the sidewall 220 for use as injection points 250 is limited to three to five openings. The illustration in FIG. 2 depicts injection points 250 in the sidewall 220 and the slag door 240. If a DC furnace were used, those skilled in the art would appreciate that lance or burners used would generally point away from the central electrodes. As described above, one problem associated with state-of-the art implementation that the effect of chemical energy input in the furnace 100 is very spatially limited.

In using burners 260 to introduce chemical energy, typically, the burners 260 will preheat the scrap positioned within the electric arc furnace 100 interior in front of the said burners. During the supersonic lancing mode, the oxygen stream initially cuts the preheated scrap, penetrates through the preheated scrap, leading to the formation of a hole which provides a path to the molten liquid pool in the combustion chamber, thereby allowing oxygen to reach the molten bath. The oxygen may then engage in metallurgical reactions. However, this implementation only provides these benefits in a limited, localized region. In other words, this reaction is only spatially limited to the affected areas 230 illustrated in FIG. 2.

In introducing chemical energy using current methodology, energy release resulting from the injections of fuel and/or oxygen space is only effective directly in front of the burner 260. However, immediately on the sides of the burner 260, scrap is not adequately affected by the chemical energy. As a result, scrap between injections points 250 may not become adequately melted. Since the ultimate goal of the process is to melt the entire scrap content of the furnace 100, the inefficiency in the current processes will cause the entire process to be performed at a much slower rate. Furthermore, the improperly melted scrap may fall in the melted steel bath and will cool down the molten bath. This undesirable effect is generally referred to as a phenomenon known as late "cave in."

In current steelmaking processes, particulates are also injected into the electric arc furnace 100 in order to enhance process efficiency. Typically, the particulates include carbon particles since additional energy is release when the injected carbon is combusted. Furthermore, the injected carbon is used to promote foaming slag reactions. The foaming slag generally surrounds the electric arc, thereby providing protection for various internal parts of the furnace 100 from arc direct radiations. Another benefit of introducing carbon injection into the combustor is a noticeable reduction in FeO, which consequently increases metallic yield. One solution per state-of-the-art technology is to inject carbon through the opened slag door 240. This solution, however, has reached its limits. In order to perform the carbon injection via the opened slag door 240, manual operations are generally required, which can be dangerous. Traditional movable manipulators used via the opened slag door 240 are generally very high maintenance parts. Also, foaming is limited to the area in front of the furnace door. With such practices, oxidized slag is immediately and continuously lost through the door immediately decreasing the yield of the process.

An alternative solution is to inject carbon particulates through the furnace sidewalls 220. This solution is provided in FIG. 3 and accompanying description below. Turning now to FIG. 3, a diagram illustrating the prior art method for injecting carbon is illustrated. Such injection generally requires a panel 310, which is usually water-cooled, made out of copper and embedded in water-cooled elements 340, composing the upper shell 120. FIG. 3 illustrates a prior art panel 310 that is used to perform carbon injection illustrated by the line/vector 320. Additionally, a lance or burner 330 is illustrated to inject oxygen, illustrated by the line/vector 350. The lance or burner is directly injected into the furnace interior. Various water-cooled elements 340 are surrounding the panel 310 and those elements compose the furnace sidewalls 220 of the upper shell 120. The portion of the panel 310 facing the inside of the upper shell 120 is aligned with the water-cooled elements 340. Additionally, the panel 310 is positioned atop the refractory line 360. The carbon injection and the oxygen injection, shown by the lines 320 and 350, are directed to the upper surface of the molten metal pool bath 315.

Various problems are associated with the implementation of the current methodology. For example, the carbon injection illustrates a line that is deflected (see line 320) from the upper surface of the molten metal pool bath 315 indicating that the penetration of the carbon injection may not be performed efficiently. As described above, the carbon injection is limited due to the bouncing of the injection material, as shown by the vector 320. Therefore, a portion of the injected particulates will bounce from the slag upper surface 316 and/or the molten metal pool bath surface 315 and will be entrained in the exhaust 540, exiting the furnace 100. Therefore, current practices generally lead directly to a partial waste of the carbon. In addition, un-burned carbon will eventually be dissociated into CO. The increase in CO level in the exhaust gas is an undesirable effect. Additionally, the increase in the CO level may generate combustion, explosion, increase in temperature, leading to problems in the water-cooled duct and bag-house.

In electric arc furnace steelmaking processes, it is desirable to inject carbon as early as possible during the heating/melting stage. With current layout and practices, steelmakers have to delay the carbon injection. One reason for such delay is due to a phenomenon known as "scrap cave-in." The injection of carbon initiates the foaming reactions of the slag, known as foaming slag. If the carbon injection is introduced before the scrap is completely melted, the foaming slag may lead to slag-coating that may attach to un-melted scraps, preventing them from correct melting. This un-melted scrap may eventually form skulls sticking to the furnace walls. During the refining period, the skulls will eventually cave-in, which may cause strong, uncontrolled endothermic reactions. These reactions can be dangerous and may damage portions of the furnace 100, including the electrodes 150. Such reactions interrupt the steelmaking process and cool down the bath. Furthermore, these reactions may generate additional CO in the exhaust gas, which may cause additional problems described above. As a consequence, using state-of-the-art technologies, the furnace operators generally delay the start of carbon injection.

Another solution to improve efficiency of furnace operations is to perform early oxygen injection. However, this early oxygen injection may generate locally high FeO content in the slag, strong mixing, and high temperature as the result of exothermic reactions. Simultaneous carbon injections may reduce the locally high FeO content due to the early oxygen injection process; however, operators are reluctant to perform early carbon injection using state-of-the-art technology because of highly undesirable consequences described above.

Yet another reason for reducing the time period when carbon is injected in the process is related to the location of the carbon injection in the furnace. Because carbon injectors are generally close to the position where the oxygen is injected (both being above the bath), strong agitation is locally created. The strong agitation, the high level of chemical reactions, and locally high temperature level results, generally lead to refractory erosion. Because of the refractory erosion, steelmakers generally reduce the time and the amount of carbon that is implemented in the steelmaking process. Therefore, such a limitation results in yet another loss of efficiency in steelmaking processes.

Steelmakers have attempted to inject the carbon directly through the refractory line 360. However, one problem associated with such a process is the resulting direct erosion of the brick locally. Additionally, existing devices for injection through the refractory walls 360 have a limited life span, requiring a special system of cooling and require a specific quality of refractory for installation. These steps also adversely affect process efficiency. Furthermore, performing maintenance upon various portions of the furnace 100 is a routing process in the steelmaking industry. The maintenance rate may be influenced by the design and practices of the chemical energy injection points. The maintenance rate is especially high for burners 330 and the pipes used to inject the carbon. Slag splashing of the burner/lance head 330 may cause plugging problems. As described above, various problems and inefficiencies are present due to the implementation of current methodology. A more efficient method and apparatus for performing chemical energy injections are desirable in the steelmaking industry.

The present invention is directed to overcoming, or at least reducing, the effects of one or more of the problems set forth above.

SUMMARY OF THE INVENTION

In one aspect of the present invention, an apparatus for increasing spatial coverage of energy in a furnace is provided. The apparatus of the present invention includes a panel positioned at least partially into a sidewall of a furnace. The panel includes a plurality of openings for injecting a material through each of the openings at least partially during the same time period.

In yet another aspect of the present invention, an electric arc furnace is provided for increasing spatial coverage of energy in a furnace. The electric arc furnace of the present invention includes a roof, an upper shell, and a lower shell. The upper shell includes a furnace portion enclosed by a sidewall. The electric arc furnace of the present invention also includes a panel that is positioned at least partially into the sidewall of the furnace. The panel includes a plurality of openings for injecting a material through each of the openings at least partially during the same time period.

In another aspect of the present invention, a method for increasing spatial energy coverage in a furnace is provided. The method of the present invention includes positioning a panel at least partially within a sidewall of the furnace. The method also includes at least partially injecting during the same time period, a primary combustion material, a secondary combustion material, and a particulate material, into the furnace.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIG. 10 illustrates the implementation of the panel of FIG. 6, in accordance with one illustrative embodiment of the present invention;

FIG. 11 illustrates the implementation of the alternative panel of FIG. 9, in accordance with one alternative illustrative embodiment of the present invention.

Figure 1:
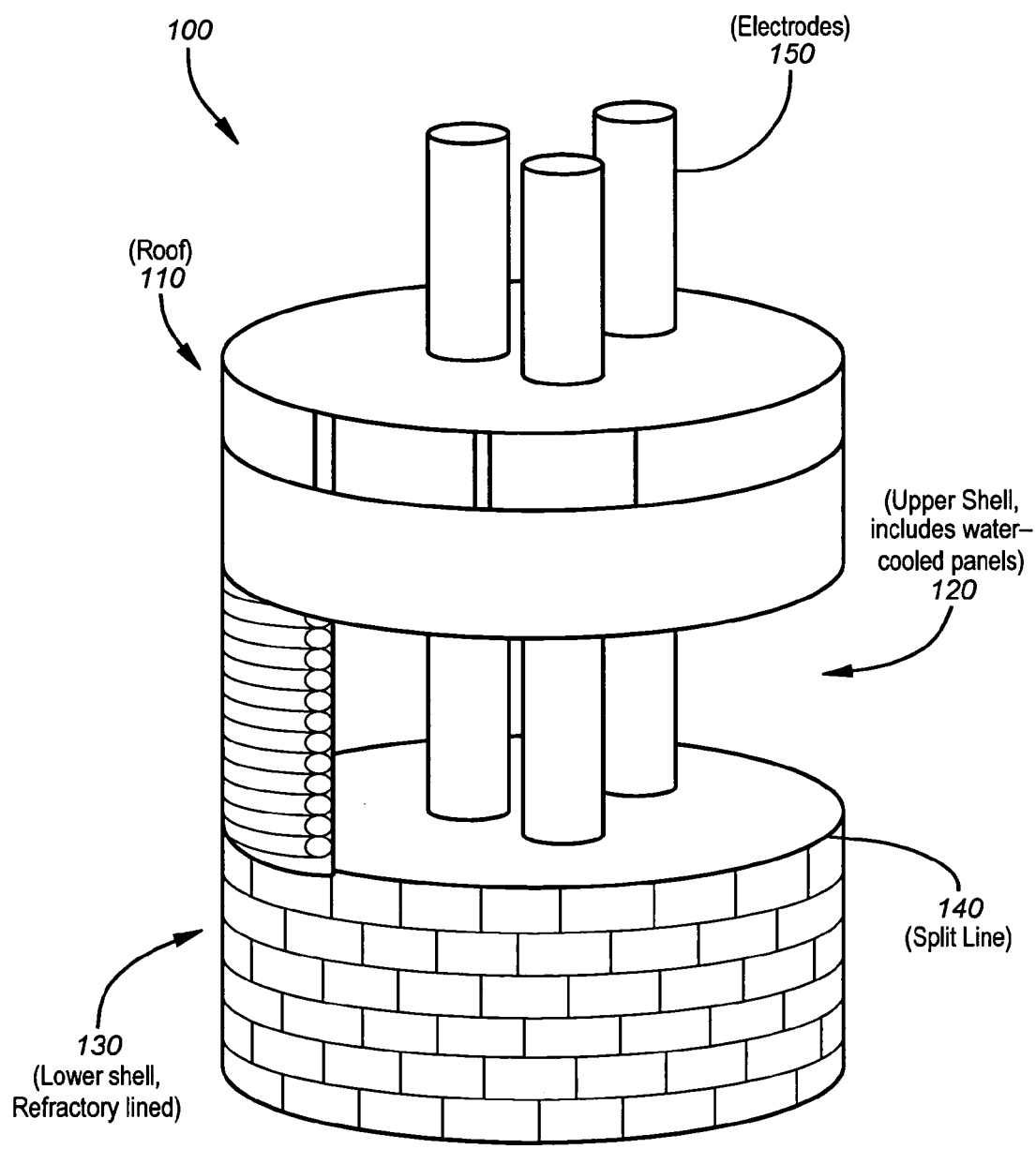
FIG. 1 illustrates a stylized prior art electric arc furnace.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Embodiments of the present invention provide for implementing chemical energy more efficiently into an electric arc furnace. Embodiments of the present invention may be used to inject fuel, oxygen, carbon and other materials to increase the energy within an electric arc furnace. The term "material" may include, but is not limited to, gas, particles, combustibles, and the like. Embodiments of the present invention provide for implementing a panel into an electric arc furnace, such that the panel is integrated, at least partially, within the sidewalls of an upper shell of an electric arc furnace, wherein direct injection of chemical energy may be achieved.

Figure 4:
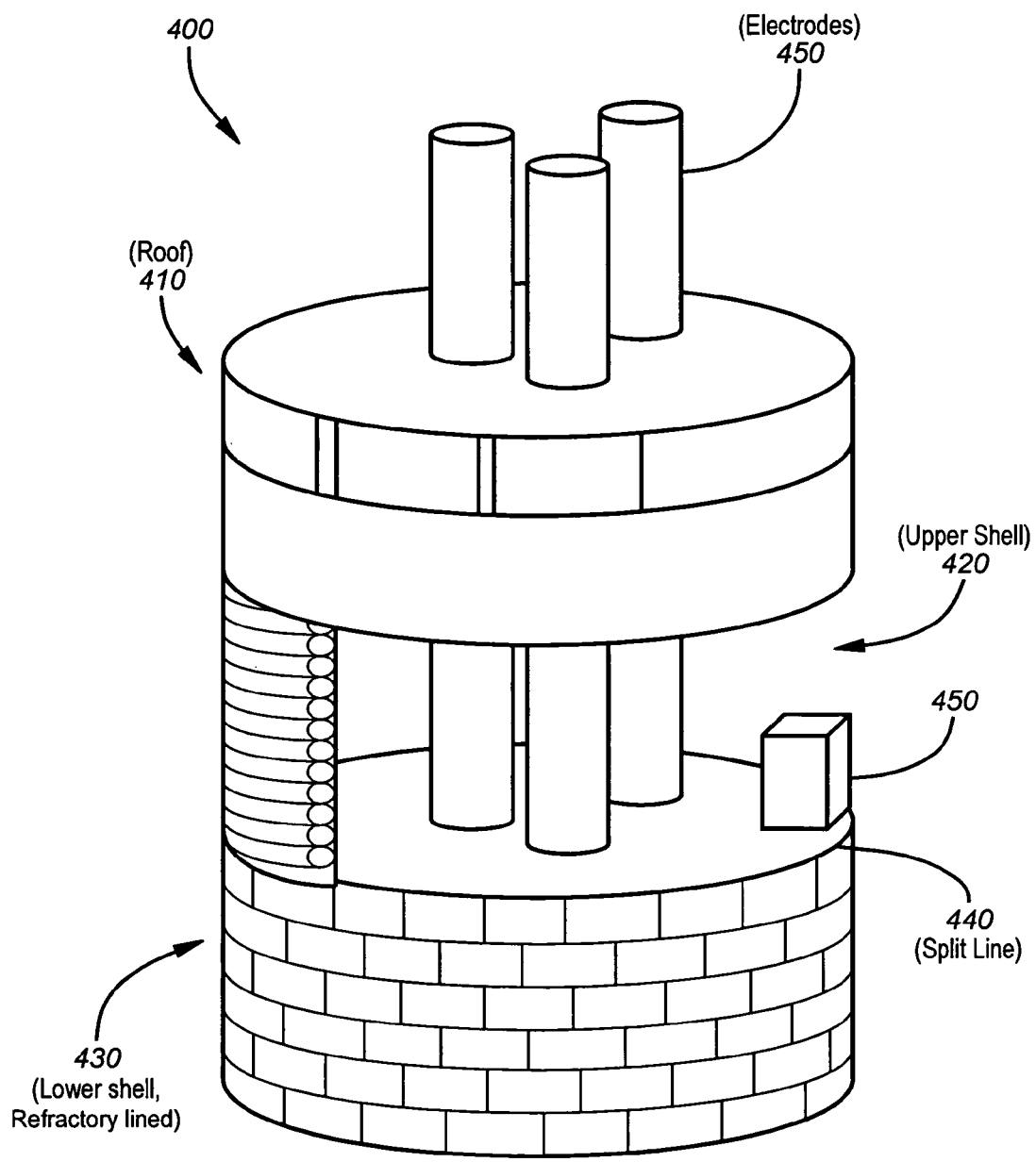
FIG. 4 illustrates a stylized electric arc furnace in accordance with one illustrative embodiment of the present invention.

Turning now to FIG. 4, an electric arc furnace 400 in accordance with embodiments of the present invention is illustrated. The electric arc furnace 400 comprises a roof 410, an upper shell 420, and a lower shell 430. The lower shell 430 houses a steel bath upon which various materials may be melted into a pool for use in steelmaking processes. One exhaust system 540 (shown in FIG. 5) may be used to capture and evacuate exhaust from the roof 410 of the furnace 400. A panel 450 is implemented within the upper shell 420 such that a more efficient implementation of chemical energy into the electric arc furnace may be realized. The upper shell 420 is generally made of water-cooled elements (steel or copper) while the lower shell 430 is generally non-water cooled refractory lined.

Figure 5:
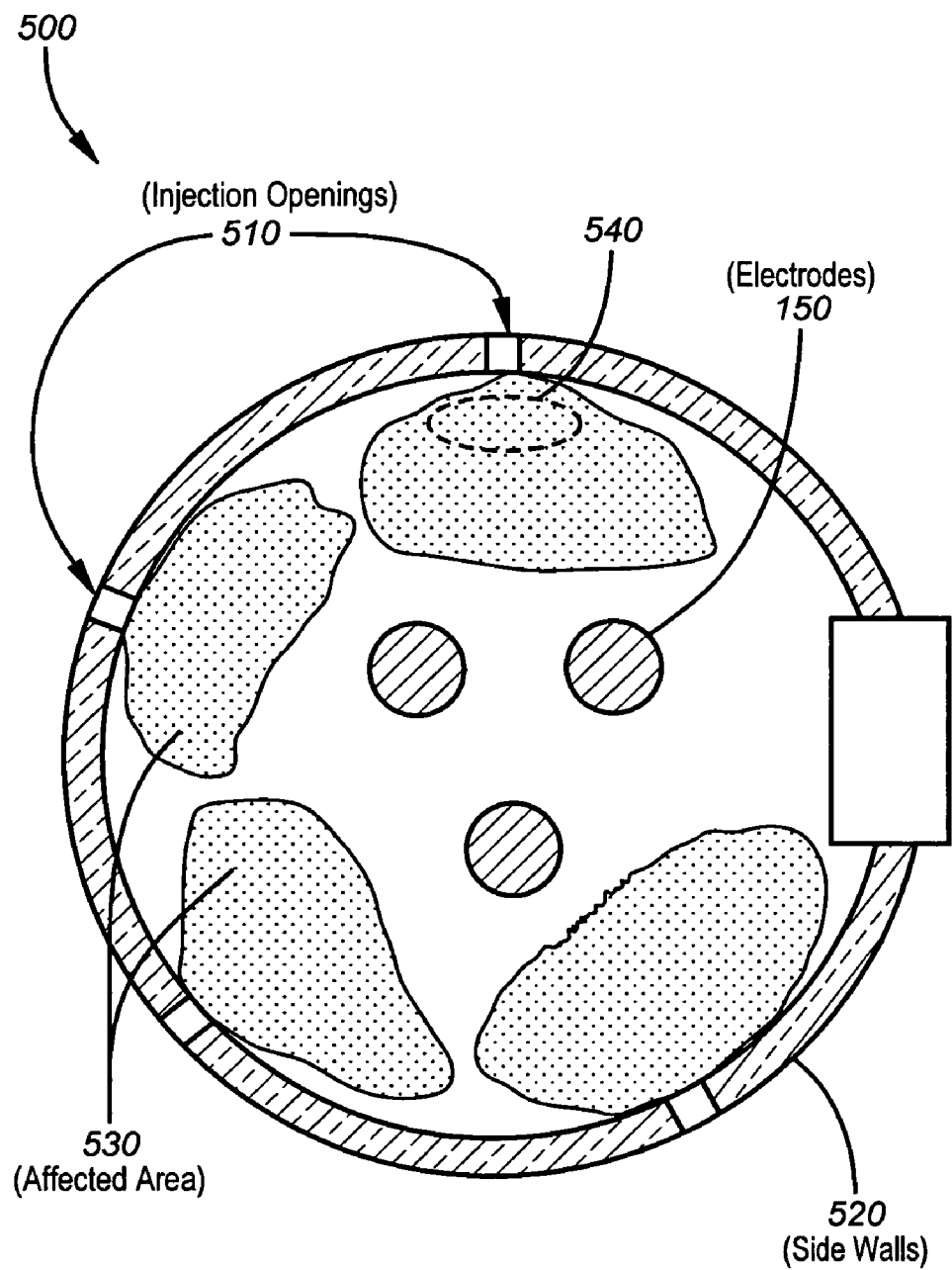
FIG. 5 illustrates a stylized plan-view cross-section of the upper shell of the electric arc furnace of FIG. 4, in accordance with one illustrative embodiment of the present invention.

Turning now to FIG. 5, a cross-section diagram of the upper shell 420 is illustrated. The cross-section 500 comprises a plurality of injection openings 510 through which various chemicals may be implemented to increase chemical energy. Utilizing the novel panel 450 illustrated in FIG. 4, more efficient injections of chemical energy may be realized. Therefore, the affected areas 530 of high energy due to chemical energy injection are more efficient and their surface is increased. Therefore, more efficient energy may be implemented into the steel bath.

Figure 2:
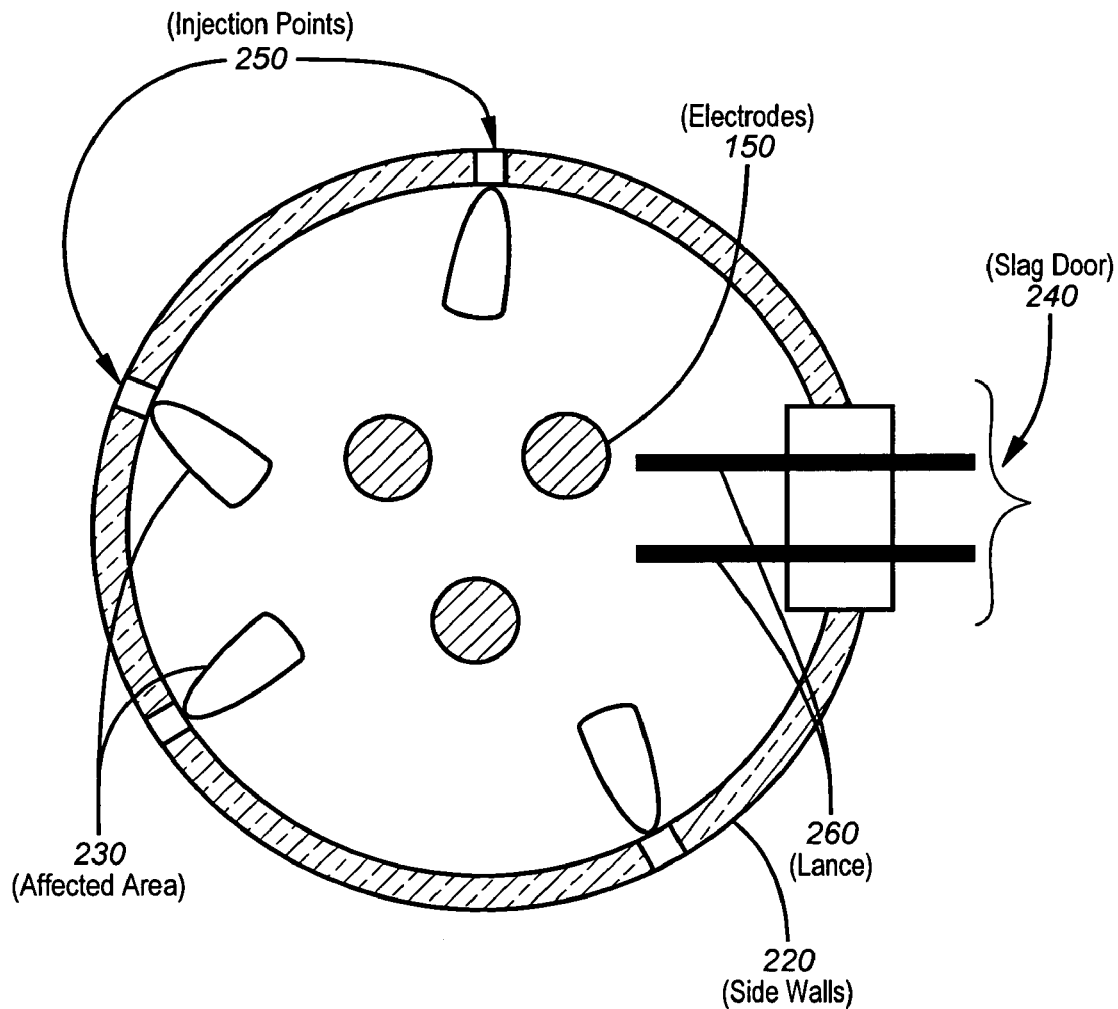
FIG. 2 illustrates a stylized plan-view cross-section of the upper shell of the prior art electric arc furnace of FIG. 1.

FIG. 5 also illustrates various injection points 510 that may house the panels 450, which are at least partially integrated within various regions of the sidewalls 520 of the electric arc furnace. In one embodiment, the panel 450, in accordance with embodiments of the present invention, may protrude within the furnace interior, wherein a certain portion of the panel 450 may reside within the sidewalls 520. Implementation of the novel panel 450 provides for the more efficient and expanded affected areas 530. As illustrated in FIG. 5, the implementation of the panel 450 into the upper shell 420 may result in more efficient delivery of chemical energy. FIG. 5 illustrates various affected areas 530 that are larger due to the novel implementation of the novel panel 450. Since the affected area 530 is larger in the cross-section diagram illustrated in FIG. 5 (as compared to the prior art cross-section diagram of FIG. 2), more efficient chemical energy is delivered in the combustion chamber, resulting in more efficient steelmaking processes. The increased efficiency may include an increase in combustion efficiency, metallurgy efficiency, and the like.

Figure 6:
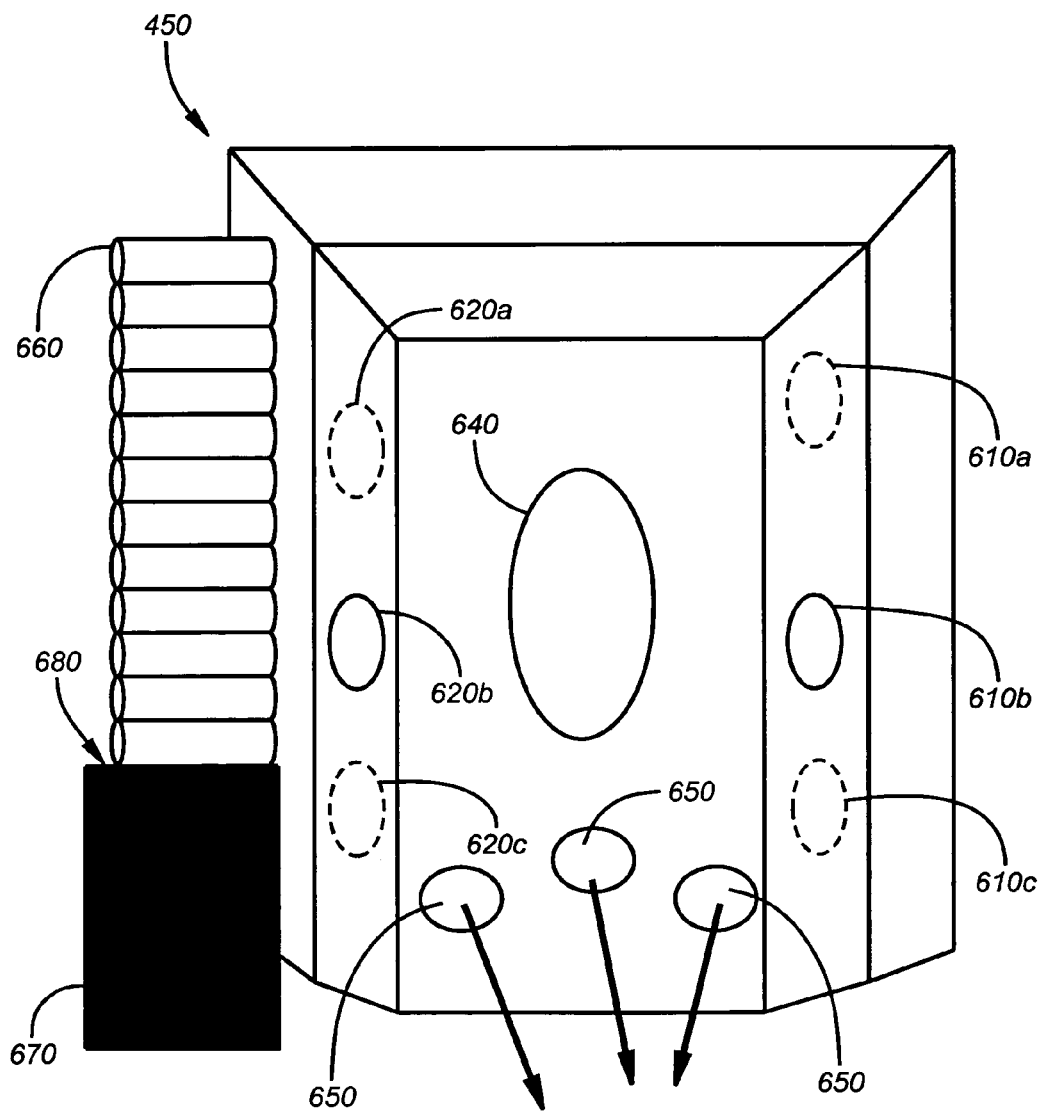
FIG. 6 illustrates a panel for performing chemical injection into an electric art furnace, in accordance with one illustrative embodiment of the present invention.

Turning now to FIG. 6, one embodiment of the panel 450 in accordance with embodiments of the present invention is illustrated. The panel 450 illustrated in FIG. 6 may protrude inside the electric arc furnace of the upper shell 420, as illustrated in FIG. 5. Referring back to FIG. 6, the illustrated panel 450 is inserted in the sidewalls 520 of the upper shell 420, generally between the water-cooled panels 660. The panel 450 may be situated inside refractory bricks 670 constituting the lower shell 430, instead of being atop the refractory line 670. The panel 450 may comprise various openings that may be utilized in various ways to implement chemical energy into the electric arc furnace. In alternative embodiments, the panel 450 may be situated in other configurations and remain within the scope and spirit of the present invention. The panel 450 comprises a series of openings that are described below.

As illustrated in FIG. 6, the panel 450 comprises a front portion and two side portions, wherein the side portions may be positioned at an angle that is less than 90 degrees (e.g., 45 degrees, 30 degrees, etc.) relative to the plane of the front portion of the panel 450. The panel 450 comprises a first series of side openings 610a, 610b, 610c, on a first side portion of the panel 450. In one embodiment, only one of the openings 610a, 610b, or 610c may be present on the panel 450. The panel 450 also comprises a second series of side openings 620a, 620b, 620c, on a second side portion of the panel 450. Likewise, in one embodiment, only one of the indicated openings 620a, 620b, 620c, may be present on the panel 450. In one preferred embodiment, two openings are generally present on the panel 450, and they may be paired as follows: 620a with 610a, 620b with 610b, and/or 620c with 610c. The panel 450 also comprises a central opening 640 in approximately the central area of the panel 450. Additionally, the panel 450 may also comprise a set of lower openings 650 on the front portion of the panel 450.

Embodiments of the present invention call for implementing a burner within the opening 640. In a first function associated with embodiments of the present invention, the central opening 640 is utilized to introduce material through the upper shell 420 to produce chemical energy within the furnace interior. Since the panel 450 is generally implemented within the sidewalls 520 of the upper shell 420 (as shown in FIG. 5), more efficient and direct injections of chemicals and/or other materials may be achieved.

In one embodiment, the central opening 640 is generally used for a burner or a lance to implement chemicals through the upper shell 420. The side openings 610 and 620 may be used for secondary oxygen combustion. The secondary oxygen combustion may be implemented by locating an opening at the position shown at 610a, 610b, or at 610c. Additionally, the lower openings 650 may be used to inject particulates in one or more openings. In some embodiments, the lower openings 650 may be located below a refractory line 680. Also, in one embodiment, the panel 450 is positioned such that it protrudes inside the upper shell 420.

Figure 7:
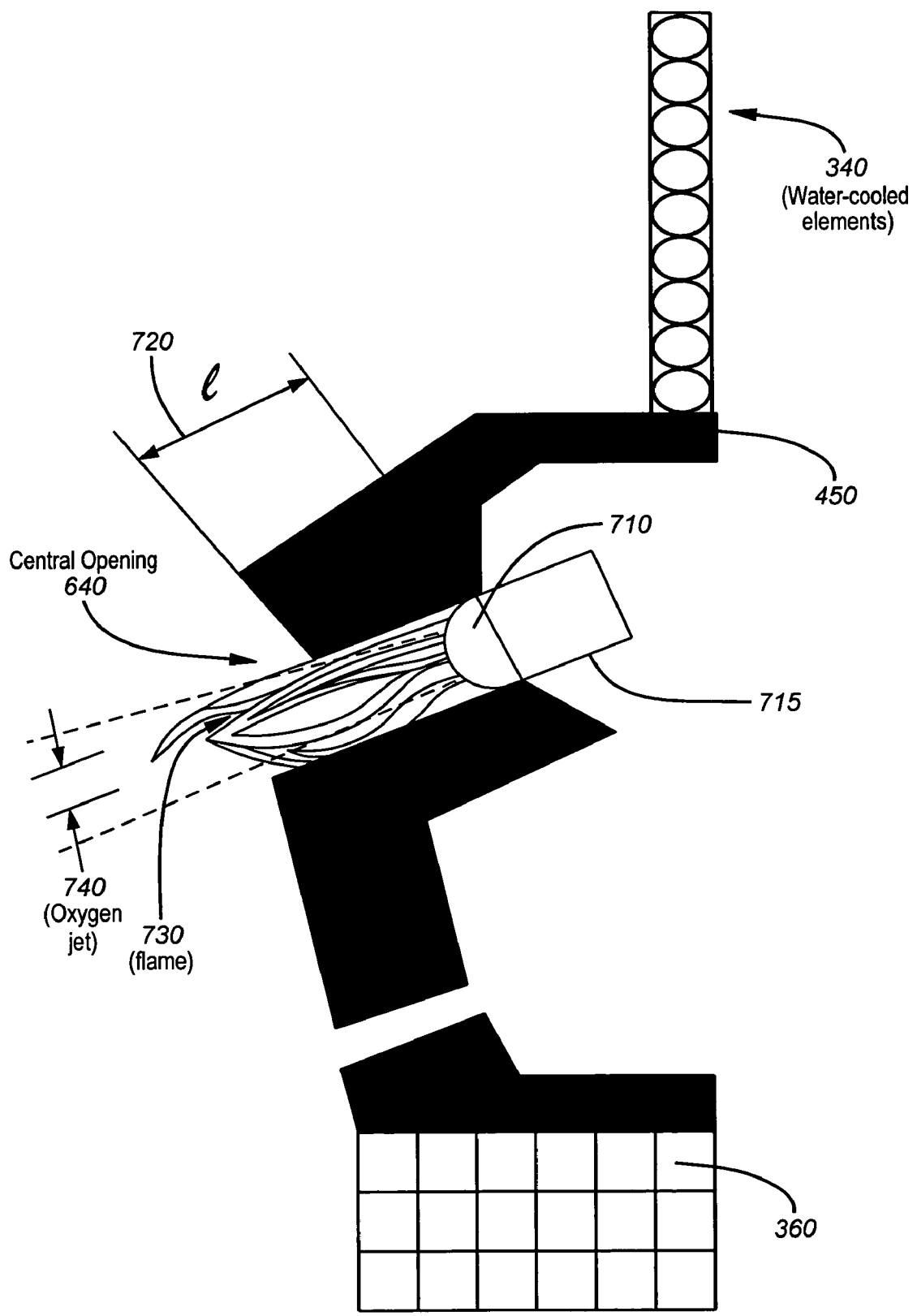
FIG. 7 illustrates a stylized elevation-view cross-section of the panel of FIG. 6, in accordance with one illustrative embodiment of the present invention.

The first function associated with embodiments of the present invention calls for utilizing the central opening 640 to implement chemical energy into the furnace. The central opening 640 is generally used for a burner or lance to implement chemicals into the furnace. In one embodiment, a burner that is used in the central opening 640 may contain or generate a supersonic oxygen jet with the presence of a flame shrouding the oxygen jet in order to increase the length of the oxygen jet that has supersonic velocity. While various factors, such as furnace heat, falling scrap, and/or steel projections (splashing) constitute a threat to the burner integrity, in one embodiment, it is preferable that the burner is protected. Referring simultaneously to FIGS. 6 and 7, the implementation of the supersonic oxygen jet is described.

Turning now to FIG. 7, a cross-section of the panel 450 from a side view depiction, in accordance with embodiments of the present invention, is illustrated. The panel 450 is positioned between the refractory bricks 360 and the water-cooled elements 340. The illustration shows a burner 715, which comprises a burner head 710. The burner 715 through the central opening 640 provides an oxygen supersonic jet 740 into the furnace interior. The burner 715 provides a flame 730. The role of the flame 730 varies during the cycle. In the melting stage of the process, the role of the flame is to melt the surrounding scrap. In the refining stage, the role of the flame is to extend the supersonic length of the oxygen jet 740.

With state-of-the art practices, the burner head 710 is generally not adequately protected and may be exposed to the furnace heat as well as to the steel projections (splashing), leading to burner damage or destruction. The presented embodiment shows the burner head 710 recessed within the central opening 640. The central opening 640 has a predetermined length 720. The flame 730 is developed within the panel 450, in the space delimited by the central opening 640. The central opening 640 acts as a combustion chamber. The central opening 640 provides an area that protects the burner head 710 from furnace heat and slag splashing. The central opening also promotes the stabilization of the flame 730.

In one embodiment, the central opening 640 has a cylindrical shape integrated into the panel 450. Those skilled in the art having benefit of the present disclosure would appreciate that other shapes, such as an octagon, etc., may be integrated into the panel 450 and remain within the spirit of the present invention. In one embodiment, geometry of the central opening 640 may be cylindrical, with a diameter being between approximately 38.1 millimeters (mm) and 127 mm in one embodiment, and approximately between 63.5 mm and 88.9 mm in another embodiment. The length 720 of the cylindrical path of the central opening 640 may be approximately 50.8 mm to 254 mm in one embodiment, approximately 88.9 mm to 177.8 mm in another embodiment, and approximately 101.6 mm in yet another embodiment. Those skilled in the art having benefit of the present disclosure would appreciate that other dimensions for the central opening 640 may be employed and remain within the scope and spirit of the present invention.

In one embodiment, the burner head 710 would be confined inside the cylindrical space of the central opening 640. When the flame 730 is substantially protected by the central opening 640, the flame 730 will become substantially stabilized. This stabilization may occur virtually independent of the respective flowrates of injected oxygen and/or injected fuel. Flame stability is of special interest when the firing rate of the burner 715 is not set at maximum, as it is generally the case during the initial moments of the heating/melting process. Stabilizing the flame 730 quickly provides the benefit of delivering early high-energy efficiency. Additionally, a stable flame 730 is desirable during the refining period when the oxygen jet goes supersonic (lancing). Using the novel panel 450, the initial section of the oxygen supersonic jet that is injected through the central opening 640 becomes generally surrounded by a stable flame 730, substantially reducing the loss in the velocity of the central jet, thereby providing high jet efficiency.

An additional advantage of the burner head 710 being recessed the in central opening 640 is that it would be substantially protected from slag splashing. Furthermore, plugging problems may be significantly reduced when the panel 450 is employed. Using the set-up illustrated in FIG. 7, maintenance may also be reduced (e.g., burner head 710 cleaning is reduced).

A second function may be associated with embodiments of the present invention. The second function is a secondary combustion oxygen implementation. In one embodiment, the oxygen implementation is not supersonic, but of a lower velocity, however, supersonic injection may be implemented and remain within the scope of the present invention. In one embodiment, the secondary combustion oxygen may at least in part, overlap the time period in which the primary or main combustion occurs. Therefore, the primary or the main combustion and the secondary combustion may at least in part be implemented at the same time using the panel 450.

Figure 8:
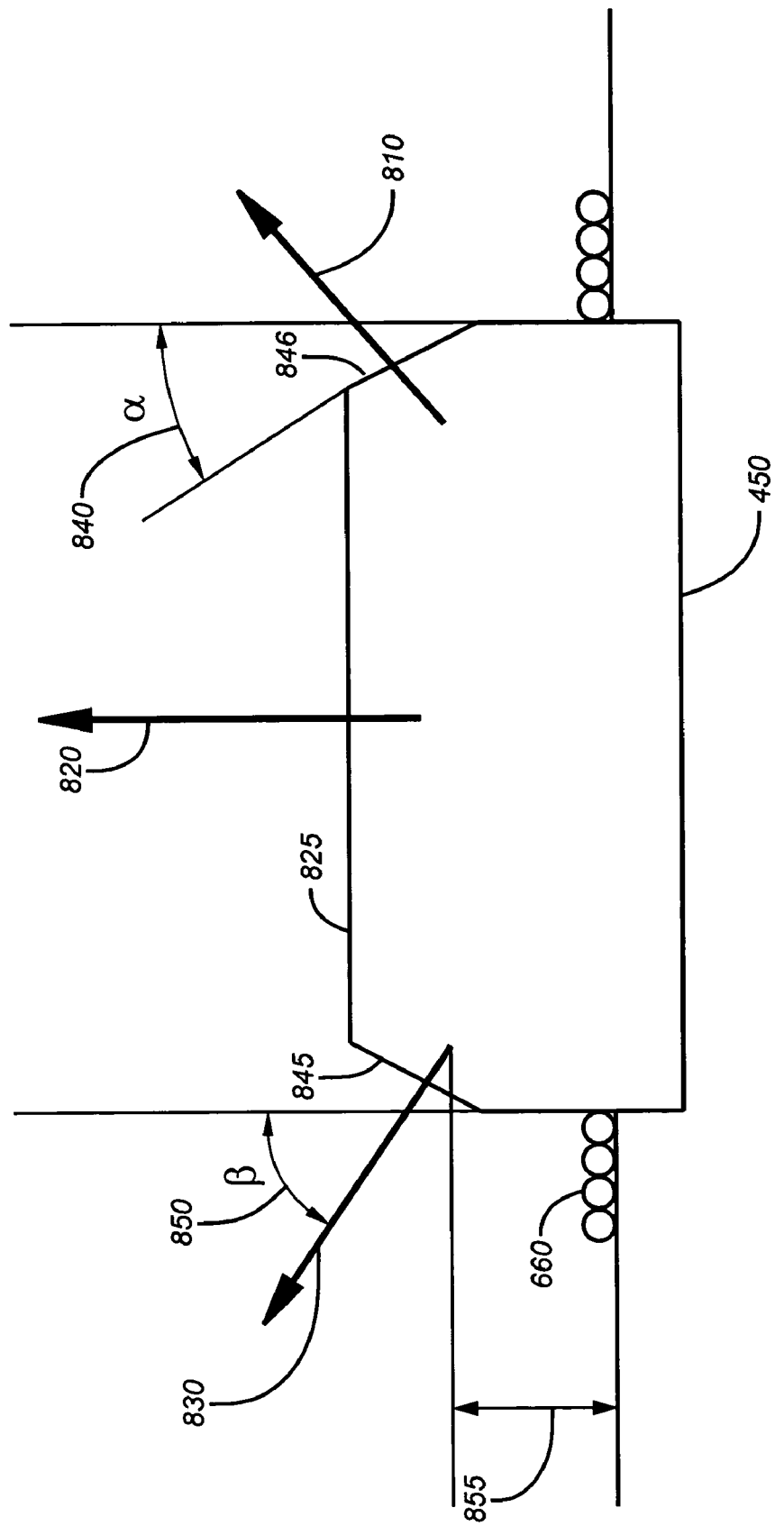
FIG. 8 illustrates a stylized top-view of the panel of FIG. 6, in accordance with one illustrative embodiment of the present invention.

Referring now to FIGS. 6, 7, and 8, a secondary combustion is described. FIG. 6 illustrates a top view of the implementation of the panel 450. FIG. 8 illustrates that the panel 450 protrudes a length 855 in front of the water-cooled panels 660, inside the furnace interior. FIG. 8 illustrates three vectors that depict the various combustion injections implemented via the panel 450. The vectors 810 and 830 represent injections performed by utilizing the side openings 610 and 620 of the panel 450. The secondary injection vectors are located on each side of the panel (see vectors 810 and 830). The vector 820 symbolizes the axis of the main burner injection from the central opening 640.

A typical scrap mix in the furnace 400 may contain several additional fuels such as oils, grease, organic material and the charge carbon, which are added in the scrap buckets. Generally, oils and grease can represent various energy release per unit of quantity (e.g., such as 25 kwh/ton to 200 kwh/ton) in the scrap mix. This energy release may be on similar scales as compared to the energy released by the primary burner 715 (using any kind of fuel, such as gaseous fuel—natural gas, propane, or liquid fuel), which may be in the range of 25 kwh/ton to 500 kwh/ton. The potential energy released by the aforementioned fuel that is present in the scrap (oil, grease, organic material and charge carbon) may be useful in preheating the scrap during the early stage of the steelmaking processes. Because of the larger affected area 530 created by employing the novel panel 450, these fuels now burn more efficiently and their pre-heating advantages are now more realized. Hence, embodiments of the present invention provide means for burning the additional fuel in the scrap during the early stages of the process, all the while increasing the spatial coverage of chemical energy input. Energy released in the area adjacent to the burner 715 may be transferred to other areas that were previously unaffected by energy release. Such widened release of energy provides improved scrap melting, reduces skulls build-up, even in the case of early carbon injection. Additionally, wide spread oxygen injection and/or combustion as described herein facilitates improved efficiency of carbon injection (charged or injected).

Figure 3:
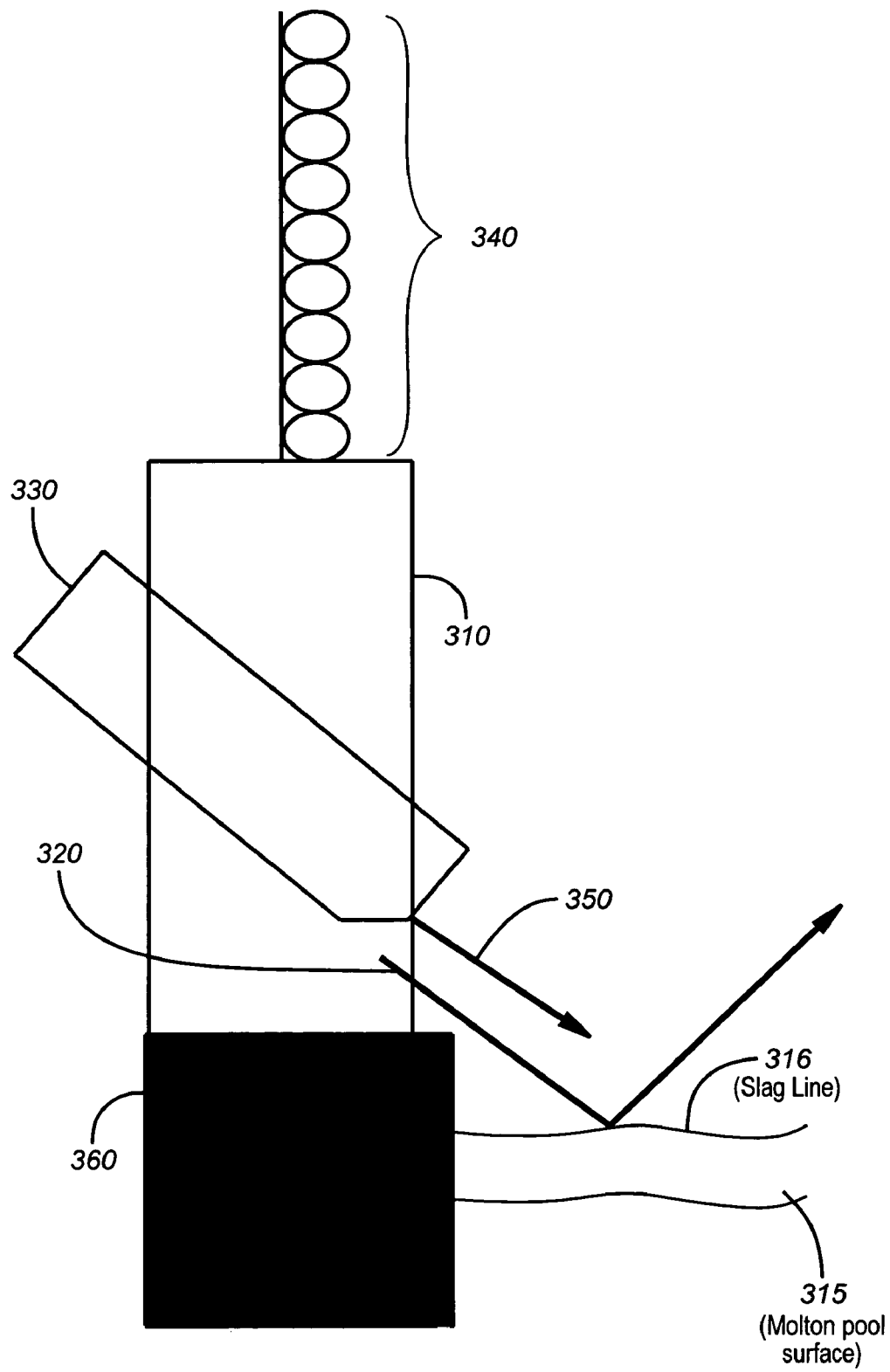
FIG. 3 illustrates a stylized prior art panel associated with the prior art electric arc furnace of FIG. 1.

In the past, lances, tips or structures supporting burners 715 were generally aligned with the water-cooled elements 340 and flushed with the furnace interior (see FIG. 3). However, secondary combustion oxygen injection will generate reactions. Such reactions occurring too close to the water-cooled elements 340 and refractory 360 may lead to local damages to the water-cooled elements 340 and/or the refractory 360, located around the area of injection. In addition, oxygen may bounce from the scrap located close to the panel 450 and directly hit the water-cooled elements on the side 660 or above 340. In order to reduce these damaging possibilities, in one embodiment, the point of injection of secondary oxygen is moved inside the furnace 400. In one embodiment, the distance 855 is between approximately 0 and 400 mm, and approximately between 200 and 300 mm in another embodiment.

The side openings 610 and 620 are located on the side portions 845 and 846 of the panel 450. The side portions 845 and 846 of the panel 450 make a horizontal angle $\alpha$ 840 to a line 847 that is perpendicular in the horizontal plane to the front face 825 of the panel 450. Furthermore, the side portions 845 and 846 of the panel are oriented such that at least one of the side portions 845 and 846 face away from the front face 825 of the panel 450. In one embodiment, the angle $\alpha$ 840 may be approximately 0 to 45 degrees, and approximately 10 to 30 degrees in another embodiment. The resulting injected oxygen indicated by the vector 830, makes an angle $\beta$ 850 with the normal reference to the panel 450. In one embodiment, the angle $\beta$ is approximately between 0 and 90 degrees, and approximately between 20 to 45 degrees in an alternative embodiment, and approximately between 30–35 degrees in yet another embodiment. In one embodiment, the angles $\alpha$ 840 and $\beta$ 850 may be different for each side. In an alternative embodiment, the angles $\alpha$ 840 and $\beta$ 850 may be approximately the same.

The side openings 610a, 620a for the secondary injectors may be located above the central opening 640 (i.e., the burner opening). The vertical distance between the side openings 610a, 620a and central axis of the central opening 640 may be between 0 mm and 800 mm in one embodiment, and approximately 400 mm to 500 mm in another embodiment. This measurement is in reference to the distance being counted from the central axis of the central opening 640. Regarding the side opening 610a, the vertical angle of the resulting jet may be between approximately 20 degrees up and 30 degrees down in one embodiment, approximately between 0 degrees up and 20 degrees down in another embodiment, and yet in another embodiment, approximately 10 degrees down. The side openings 610b, 620b for secondary injectors may be located at the same level as the central opening 640 (burner 715 opening). Regarding the side openings 610b, 620b, the vertical angle of the resulting jet from these openings may be between approximately 10 degrees up and 20 degrees down in one embodiment, and approximately between 8 degrees up and 12 degrees down in an alternative embodiment.

The side openings 610c, 620c for secondary injectors may be located below the central opening 640 (burner 715 opening) and below the side openings 610b, 620b. The vertical distance between the side openings 610c, 620c and axis of the central opening 640 (burner 715 opening) may be between approximately 0 mm and 800 mm in one embodiment, and between approximately 400 mm to 500 mm. Regarding the side openings 610c, 620c, the vertical angle of the resulting jet from these openings may be between approximately 10 degrees up and 30 degrees down in one embodiment, and between approximately 10 degrees up and 20 degrees down in an alternative embodiment.

The velocity of the secondary combustion oxygen from the side openings 610, 620 may vary between 50 meters per second and supersonic velocity. In one embodiment of the invention, this velocity may be varied during the melting process. At the initial stage of the heat, the velocity is generally low (e.g., approximately 50 meters per second), which increases up to supersonic velocity at the end of scrap melting. During the refining stage of the steelmaking process, the chemical injections trough opening 610 and 620 may either be shutdown or decreased at holding flow. In another embodiment, during the refining stage, the oxygen may be injected to perform post-combustion. Post-combustion of CO will decrease bag-house temperature and bring additional heat to the molten bath.

A third function utilizing embodiments of the present invention may be employed to inject particulates into the furnace. The particulate injection may include carbon and/or other material. Therefore, different types of injections may be used for metallurgical reactions and/or to provide chemical energy into the furnace. With the proposed embodiment, these particulate injections may be manipulated to generate a local balance between endothermic and exothermic reactions. The particulate injections are generally performed by the lower openings 650, which in the illustrated embodiments provide three openings, however, multiple openings may be implemented by those skilled in the art having benefit of the present invention. Therefore, if one opening is plugged, other openings may be used to perform the injections.

The holes relating to the lower openings 650 are generally located below the refractory line 680, inside the refractory bricks 670. Consequently, substantially all the particulates will be injected into the slag. The injected particles generally cannot escape the slag. Additionally, the injected particles may not bounce out into the exhaust 540. These features add additional efficiency to the steelmaking processes. Utilization of the panel 450 provides for the combination and the balance of endothermic reactions and exothermic reactions.

Using embodiments of the present invention, a local balance between endothermic and exothermic reactions is now possible. With previous practices, generally only one type of reaction is privileged at a time, leading to problems, such as furnace walls overheating, refractory erosion, etc. With the embodiments of the present invention, the refractory bricks 670 are not directly exposed to only one set of those reactions. Additionally, the panel 450 located inside the refractory bricks 670 is made more resistant to attacks from the surrounding chemical reactions. Consequently, the refractory problems mentioned above are substantially reduced by implementing embodiments of the present invention.

The first set of reactions are the exothermic reactions, which are generated by the oxygen, injected either by the primary oxygen on the burner 715 (central opening 640) or by the secondary combustion injectors (side openings 610, 620). The second set of reactions are the endothermic reactions, which are generated by the injection of the carbon particulates. In such case, only one of the lower openings 650 may be used. The two other holes of the lower opening 650 are generally available for change of holes. A change in the use of one hole to another hole (of the lower opening 650) may be made in response to a functioning hole being plugged without slowing down the operations or delaying slag foaming reactions. In one embodiment, the carbon is injected directly in the slag via the lower opening 650. As a result, foaming reaction efficiency may be enhanced, thereby improving the performance of the furnace 400.

In another embodiment, the endothermic reactions are generated by the injection of other compounds, such as CaO, MgO, CaOMgO, among others, through the lower openings 650 of the panel 450. These injected elements may be used for slag chemistry control. If injected without the balancing effect provided by the use of the panel 450, excessively strong chemical reactions (such as MgO attack on the refractory bricks 670) may occur. In one embodiment, the endothermic reactions may be generated by the injection of furnace dusts through the opening 650. In one embodiment, the exothermic reactions may be generated by alumina-based elements (e.g., as alumina slag, aluminum dross, etc.) through the opening 650.

Figure 9:
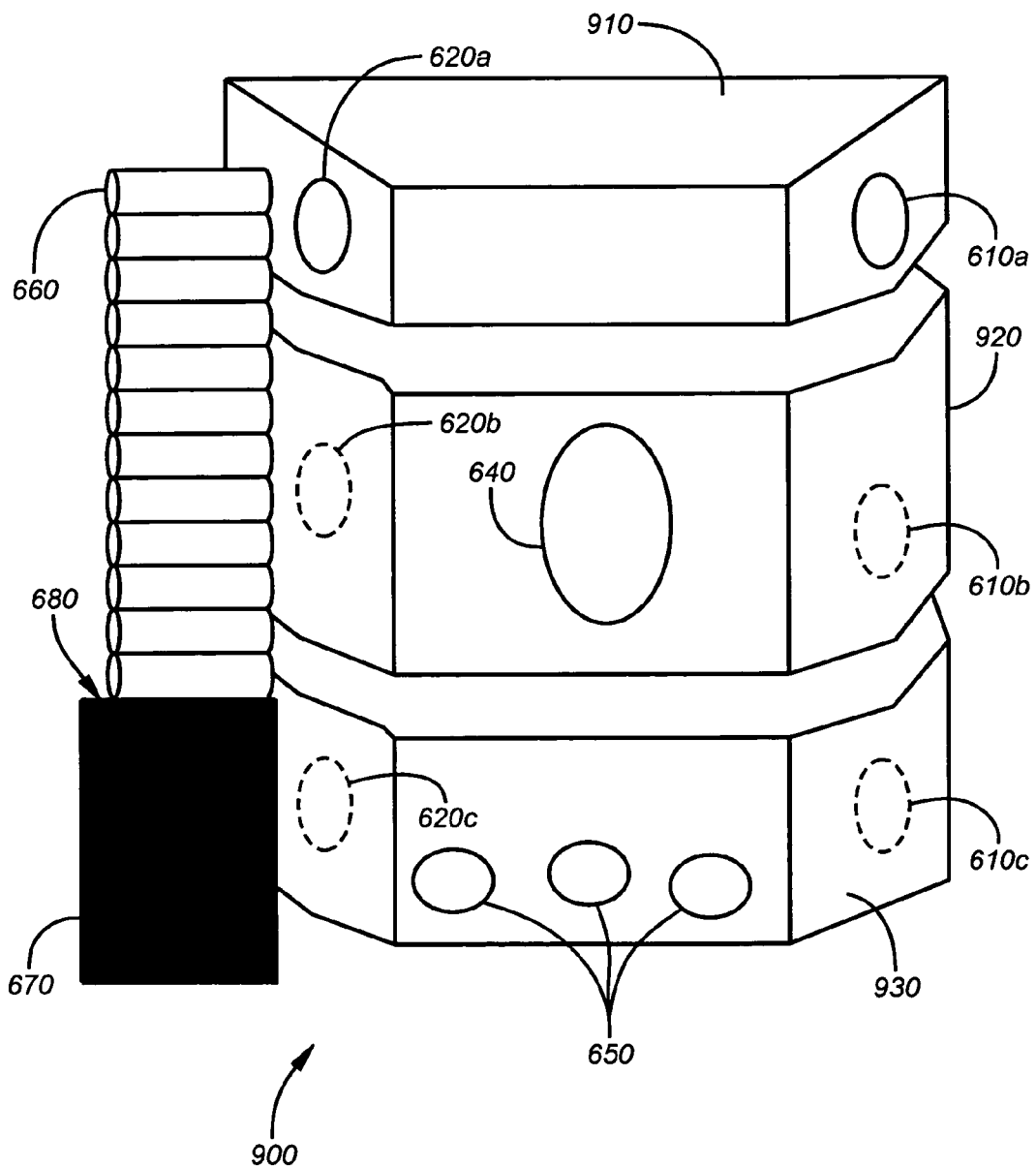
FIG. 9 illustrates an alternative implementation of the panel of FIG. 6, in accordance with one alternative illustrative embodiment of the present invention.

Turning now to FIG. 9, an alternative embodiment of employing the panel 450 is illustrated. FIG. 9 illustrates a separate panel arrangement 900. This separate panel arrangement 900 comprises a top panel 910, a middle panel 920, and a bottom panel 930. In an alternative embodiment, the top, middle, and bottom panels 910, 920, 930 may be three separate panels. In one embodiment, the top panel 910 may comprise the side openings 610a and 620a. Likewise, the middle panel 920 may comprise the central opening 640, along with the alternative side openings 610b and 620b. The bottom panel 930 may comprise the lower openings 650, along with the alternative side openings 610c and 620c. In one embodiment, the separate panel 900 may be situated or positioned in a similar fashion as the panel 450.

Since the top panel 910 comprises the side openings 610a and 620b, this panel may be used for secondary combustion oxygen. Although, as indicated by the dotted regions shown on the middle and bottom panels 920, 930, these panels may also be used for secondary combustion oxygen. Since the middle panel 920 includes the central opening 640, this panel may be used for main burner or lance processes. Furthermore, since the bottom panel 930 comprises the lower openings 650, this panel may be used for implementing the particulates injection. In one embodiment, the upper, middle, and bottom panels 910, 920, 930 may be water-cooled copper panels. The upper panel 910 generally does not experience the same amount of heat that the middle and bottom panels 920, 930 experience. Therefore, the middle and bottom panels 920, 930 may be manufactured from a variety of impact resistant water-cooled material.

Those skilled in the art having benefit of the present disclosure would appreciate that the three functions (i.e., main burner or lance processes, secondary combustion oxygen, and particulates injection) may be interchangeable among the three panels (the upper, middle, and bottom panels 910, 920, 930. This interchangeability may be achieved by placing side openings 610, 620, the central opening 640, and the lower openings 650 on desired subpanels 910, 920, 930. This interchangeability allows for flexibility in furnace operations while still providing the quality of the chemical energy spatial coverage that is provided by embodiments of the present invention. Those skilled in the art having benefit of the present disclosure will appreciate that the functions described above may be used independently. In one embodiment, only one of the panels 910, 920 or 930 may be installed. In another embodiment, two of the panels 910, 920, 930 may be installed, while in yet another embodiment, all of the panels 910, 920, 930 may be installed. However, when installing multiple panels 910, 920, 930, in one embodiment, they are generally not installed at the same location in the sidewalls but at different spatial locations.

Turning now to FIGS. 10 and 11, a side view depiction of the employment of the panel 450 and the separate panel 900, are respectively illustrated. As illustrated in FIGS. 10 and 11, the central opening 640 provides the injection vector 1010 and 1110 representing the burner/lance processes. The injection vectors 1020 and 1120 represent the injections from the side openings 610 and 620, which may be used for secondary combustion oxygen. In FIG. 11, the vector 1120 originates from the top panel 910. The vector 1120 for the secondary combustion oxygen, which represents an injection from the side opening 610a, may be at a vertical angle γ. The vertical angle γ may be caused by the resulting jet and may be between approximately 20 degrees up and 30 degrees down in one embodiment, approximately between 0 degrees up and 20 degrees down in another embodiment, and yet in another embodiment, may be approximately 10 degrees down.

The particulate injection from the lower openings 650 in FIG. 11, which is represented by the vector 1130, generally originates from the bottom panel 930. The lance/burner operation may be performed using the middle panel 920. A vector 1110 represents the lance/burner operation performed via the central opening 640 located in the middle panel 920. Therefore, the combination of the top, middle, and bottom panels 910, 920, 930 perform essentially similar functions as the panel 450. Therefore, as illustrated by FIGS. 10 and 11, the implementation of the panels 450 with multiple openings for injection of chemical energy may be achieved by the panel 450 and/or the separate panel 900. As described above, the implementation of only one or two of those panels is possible, as well as the implementation of all of the panels 910, 920, 930, which is generally not implemented at the same location in the furnace, but distributed at different furnace locations.

Figure 12:
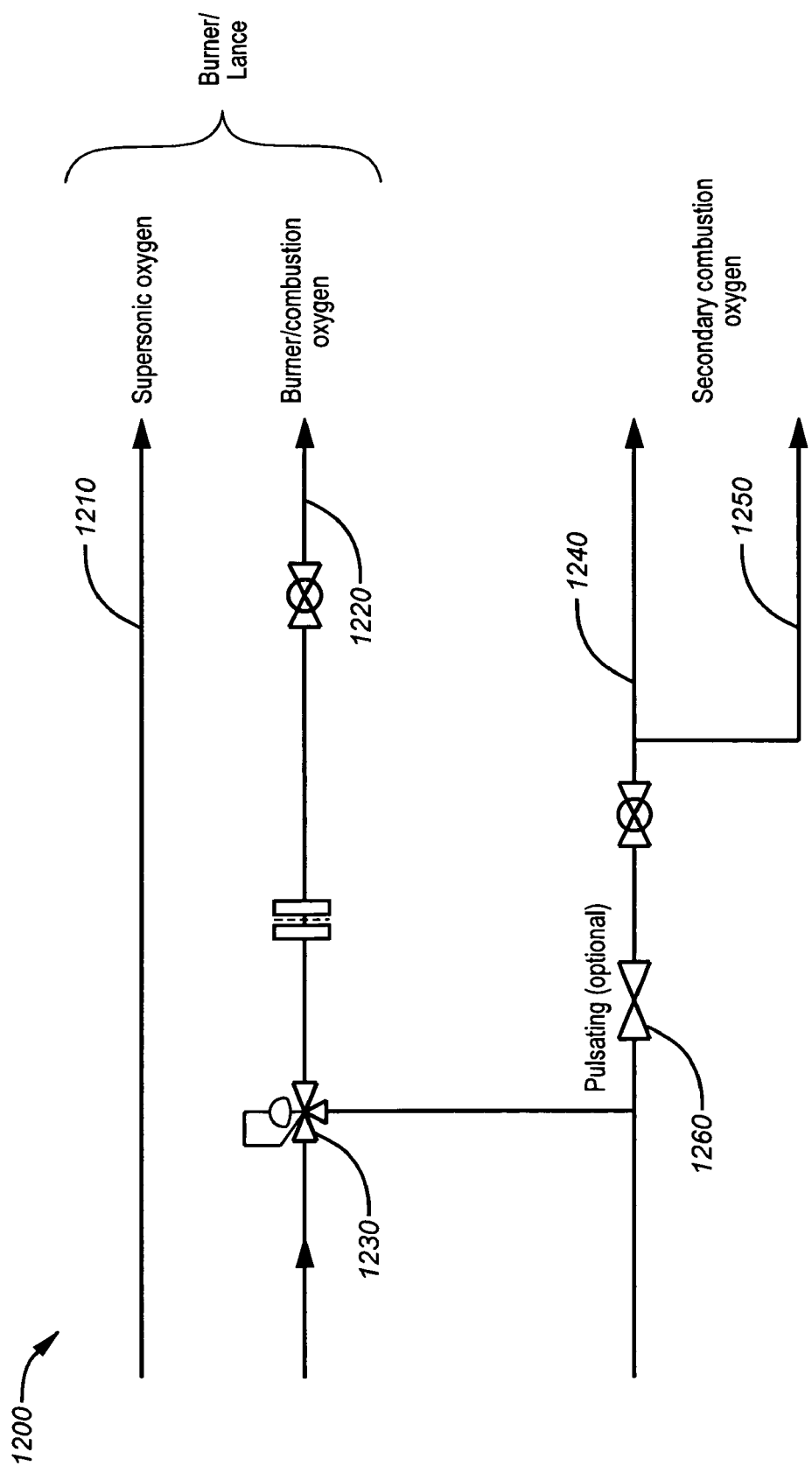
FIG. 12 illustrates a stylized diagram for implementing a secondary combustion oxygen injection, in accordance with one illustrative embodiment of the present invention.

Embodiments of the present invention may be implemented into existing steelmaking apparatus by performing retrofit procedures, such as a solution for retrofit of existing valve train installations. Turning now to FIG. 12, a diagram for implementing a solution for utilizing a valve train in accordance with embodiments of the present invention is illustrated. The option of pulsating the combustion oxygen is also described.

As illustrated, in many prior art furnace installations, generally two oxygen lines exist per burner: one for the supersonic oxygen and one for the primary combustion oxygen. Generally, those prior art systems do not allow the control of an additional line, for instance, the secondary combustion oxygen. One alternative is to build an entire new line, dedicated to the secondary combustion oxygen. One alternate solution for furnace installation 1200 in accordance with the present is illustrated in FIG. 12. In the furnace installation 1200, two independently controlled oxygen lines exist: one for providing supersonic oxygen on a line 1210, and the other one for providing primary combustion oxygen on a line 1220. The furnace installation 1200 provides for controlling the secondary combustion oxygen. The configuration illustrated in FIG. 12 provides for controlling secondary combustion oxygen without adding additional control valves and associated sensors.

The configuration in FIG. 12 provides a back-pressure regulator 1230. The back-pressure regulator 1230 may be coupled to the existing primary combustion oxygen line to provide the capability of controlling the primary and secondary oxygen flows. As an example, the pressure regulator 1230 may be set-up with a backpressure of 75 psig. Due to the pressure regulator 1230 being set with a backpressure of 75 psig, if the pressure falls below 75 psig, oxygen will flow only to the primary combustion oxygen. When the pressure is increased above 75 psig, the pressure regulator 1230 becomes opens. When the pressure regulator 1230 opens, oxygen is allowed to flow into a secondary combustion oxygen line 1240. Using the configuration of FIG. 12 in conjunction with the panel 450, oxygen flow of the secondary combustion oxygen line 1240 is split into two paths, lines 1240 and line 1250 to respectively associated injectors (such as 610 and 620). Each path, lines 1240 and line 1250, may carry substantially equal amounts of secondary combustion oxygen. The configuration illustrated in FIG. 12 provides for control of the primary and secondary combustion oxygen lines 1240, 1250.

In an alternative embodiment of the configuration illustrated in FIG. 12, the secondary combustion oxygen may be pulsed to increase the penetration length in the furnace interior of the secondary combustion oxygen delivered by line 1240. The pulsating of the secondary combustion oxygen may be performed using a pulsating valve 1260. Alternatively, pulsating of the secondary combustion oxygen may be performed directly through the design of the injector associated with the secondary combustion oxygen line 1240. This design may be performed by those skilled in the art having benefit of the present invention. Due to the pulsating of the secondary combustion oxygen, the length of penetration of the secondary combustion oxygen is increased and local turbulence that will favor the balance is described above. Furthermore, pulsating of the secondary combustion oxygen may also generate more flame surface between oxygen and surrounding fuel, thereby increasing chemical energy spatial coverage, which increases the energy available for melting the scrap, hence, increasing the efficiency of the operation of the furnace 400.

Employing embodiments of the present invention, more efficient implementation of chemical energy into an electric arc furnace may be realized. Embodiments of the present invention provide for a panel 450 that provides a plurality of openings 610, 620 that may be implemented into a sidewall 520 of an upper shell 420 (920) of the electric arc furnace.

A plurality of injections may be efficiently controlled and implemented, such that larger affected areas may be realized due to the energy injection. Utilizing embodiments of the present invention provides for more efficient processing in the steelmaking arts. The embodiments of the present invention may also be implemented in other types of manufacturing processes and remain within the scope of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
a panel positioned at least partially into a sidewall of a furnace, said panel comprising:
a plurality of openings for injecting a material through each of said openings at least partially during the same time period; and
a front portion, a first side portion, and a second side portion,
wherein at least one of said openings is located in at least one of said first and second side portions, and wherein at least one of said first and second side portions is positioned at an angle that is less than 90 degrees relative to the plane of said front portion of said panel.

2. The apparatus of claim 1, wherein said furnace is associated with an electric arc furnace.

3. The apparatus of claim 1, wherein said panel comprises a central opening, first side opening, a second side opening, and a lower opening.

4. The apparatus of claim 1, wherein said angle is about 45 degrees.

5. The apparatus of claim 3, wherein said lower opening is below a refractory line of said furnace.

6. The apparatus of claim 3, wherein said central opening is positioned upon said front portion.

7. The apparatus of claim 6, wherein said central opening comprises a cylindrical area for stabilizing a flame.

8. The apparatus of claim 7, wherein said central opening is positioned at an angle relative to a horizontal reference, such that lancing of a material is performed at an angle relative to a horizontal reference.

9. The apparatus of claim 7, wherein said central opening comprises a cylindrical area that has a diameter between a range of about 38.1 millimeters to about 127 millimeters.

10. The apparatus of claim 7, wherein said central opening comprises a cylindrical area that has a diameter between a range of about 63.5 millimeters and about 88.9 millimeters.

11. The apparatus of claim 7, wherein a cylindrical path associated with the central opening has a length in the range of about 50.8 millimeters and about 254 millimeters.

12. The apparatus of claim 7, wherein a cylindrical path associated with the central opening has a length in the range of about 88.9 millimeters and about 177.8 millimeters.

13. The apparatus of claim 7, wherein a cylindrical path associated with the central opening has a length of about 101.6 millimeters.

14. The apparatus of claim 6, wherein said central opening is adapted to provide combustion oxygen.

15. The apparatus of claim 3, wherein said first side opening is positioned upon said first side portion of said panel.

16. The apparatus of claim 3, wherein at least one of said first side opening and said second side opening is adapted to provide a secondary combustion oxygen.

17. The apparatus of claim 3, wherein said second side opening is positioned upon said first side portion of said panel.

18. The apparatus of claim 3, wherein said lower opening is positioned upon a lower shell of said front portion of said panel.

19. The apparatus of claim 18, wherein said lower opening is positioned at an angle relative to a horizontal reference.

20. The apparatus of claim 19, wherein said lower opening is adapted to provide a particulate injection.

21. The apparatus of claim 3, wherein said panel comprises a plurality of lower openings.

22. The apparatus of claim 3, wherein said panel comprises a plurality of first side openings.

23. The apparatus of claim 3, wherein said panel comprises a plurality of second side openings.

24. The apparatus of claim 3, wherein a stream of material injected through at least one of said first and second side openings is injected at an angle less than 90 degrees in the horizontal relative to a front face of said front portion.

25. An electric arc furnace, comprising:
a roof;
a lower shell;
an upper shell comprising an electric arc furnace portion enclosed by a sidewall; and
a panel positioned at least partially into said sidewall of said electric arc furnace portion, said panel comprising:
a front portion, a first side portion, and a second side portion; and
a plurality of openings for injecting a material through each of said openings at least partially during the same time period,
wherein at least one of said openings is located in at least one of said first and second side portions, and wherein at least one of said first and second side portions is positioned at an angle that is less than 90 degrees relative to the plane of said front portion of said panel and wherein at least one of said first and second side portions faces away from said front portion.

26. The electric arc furnace of claim 25, further comprising a pressure regulator for controlling a primary oxygen flow and a secondary oxygen flow.

27. The electric arc furnace of claim 25, wherein said panel comprises a central opening, first side opening, a second side opening, and a lower opening.

28. The electric arc furnace of claim 27, wherein said central opening is positioned upon said front portion.

29. The electric arc furnace of claim 28, wherein said central opening comprises a cylindrical area for stabilizing a flame.

30. The electric arc furnace of claim 29, wherein said central opening is positioned at an angle relative to a horizontal reference, such that lancing of a material is performed at an angle relative to a horizontal reference.

31. The electric arc furnace of claim 30, wherein said central opening is adapted to provide combustion oxygen.

32. The electric arc furnace of claim 28, wherein said first side opening is positioned upon said first side portion of said panel.

33. The electric arc furnace of claim 28, wherein at least one of said first side opening and said second side opening is adapted to provide a secondary combustion oxygen.

34. The electric arc furnace of claim 33, wherein said secondary combustion oxygen is controlled by a backpressure regulator.

35. The electric arc furnace of claim 33, wherein said secondary combustion oxygen is controlled by pulsating valve.

36. The electric arc furnace of claim 33, wherein said secondary combustion oxygen is controlling an injector to inject the secondary combustion oxygen.

37. The electric arc furnace of claim 28, wherein said second side opening is positioned upon said first side portion of said panel.

38. The electric arc furnace of claim 28, wherein a lower opening is positioned upon a lower shell of said front portion of said panel.

39. The electric arc furnace of claim 38, wherein said lower opening is positioned at an angle relative to a horizontal reference.

40. The electric arc furnace of claim 39, wherein said lower opening is adapted to provide a particulate injection.

41. The electric arc furnace of claim 28, wherein said panel comprises a plurality of lower openings.

42. The electric arc furnace of claim 28, wherein said panel comprises a plurality of first side openings.

43. The electric arc furnace of claim 25, wherein said roof, said upper shell, and said a lower shell define a region in which melting and refining reactions occur.

44. The electric arc furnace of claim 26, wherein said pressure regulator provides a backpressure of about 75 psig.

45. The electric arc furnace of claim 26, further comprising a pulsating valve for pulsing the secondary oxygen flow.

46. A method for increasing a spatial coverage of energy, comprising:
positioning a panel at least partially within a sidewall of a furnace, wherein said panel comprises a front portion, a first and second side portions facing away from said front portion, and a plurality of openings for infecting a material through each of said openings, said openings comprising:
a central opening positioned upon a front portion of said panel; and
a lower opening located below a refractory line of said furnace; and
injecting at least partially during the same time period, a primary combustion material, a secondary combustion material, and a particulate material, into said furnace through said panel, wherein said particulate matter is injected at least partially through said lower opening wherein at least one of said opening is located in at least one of said first and second side portions at an angle that is less than 90 degrees relative to the plane of said front portion of said panel.

47. The method of claim 46, wherein said injecting step injects a primary combustion oxygen, a secondary combustion oxygen, and a particulate injection at least partially during the same time period.

48. The method of claim 46, wherein said energy includes a chemical energy, in which a spatial coverage of said chemical energy is increased.

* * * * *